May 27, 1947. W. F. HEROLD 2,421,328
INDUSTRIAL TRUCK
Filed May 30, 1945 2 Sheets-Sheet 1
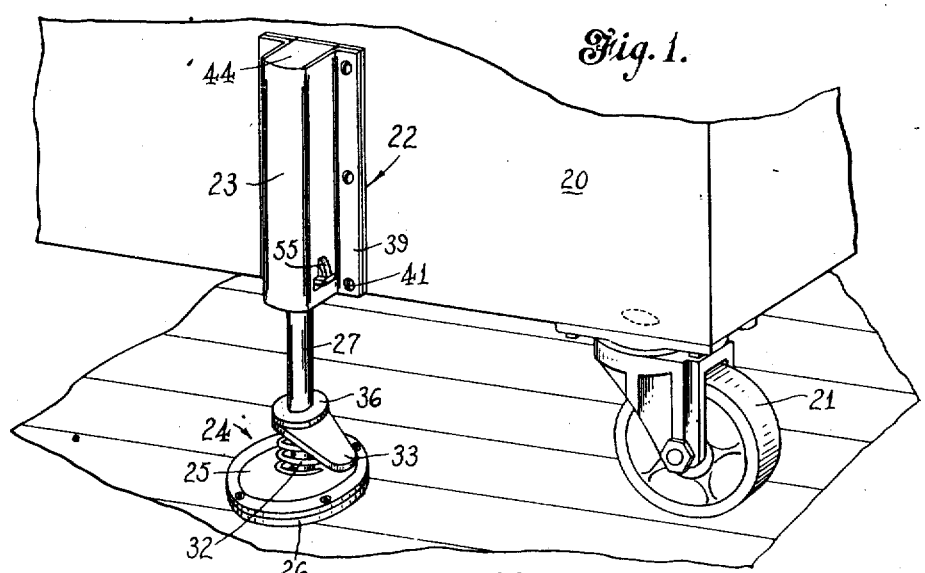
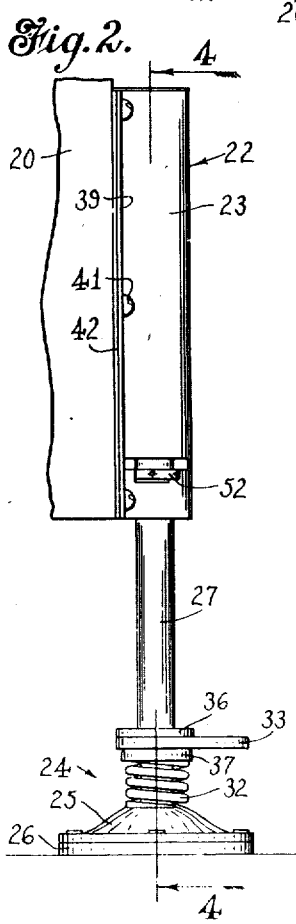
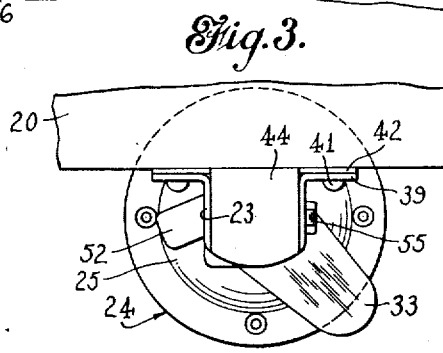
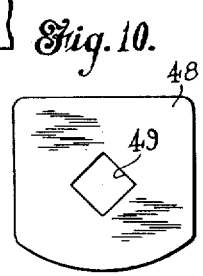
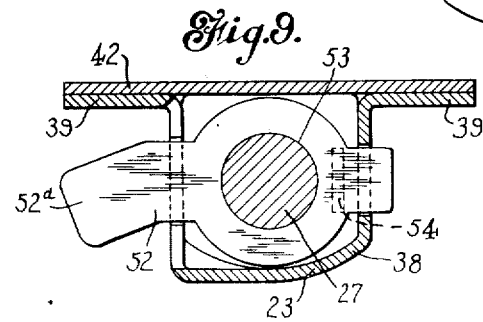
Inventor
Walter F. Herold
By Rockwell Bartholow
Attorneys May 27, 1947.  W. F. HEROLD  2,421,328
INDUSTRIAL TRUCK
Filed May 30, 1945  2 Sheets-Sheet 2
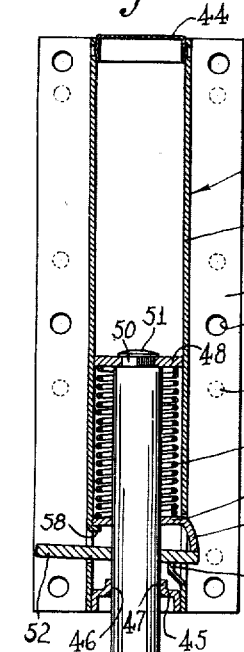
Fig. 4.
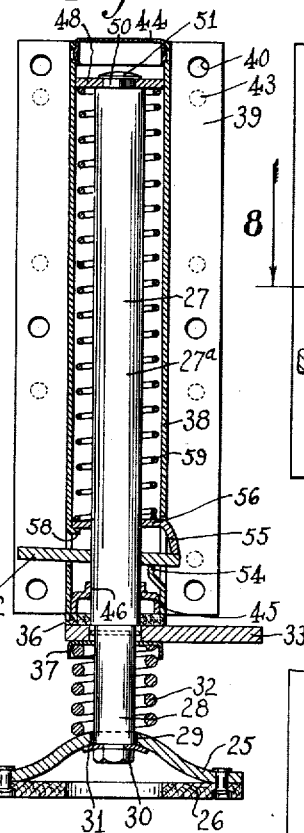
Fig. 5.
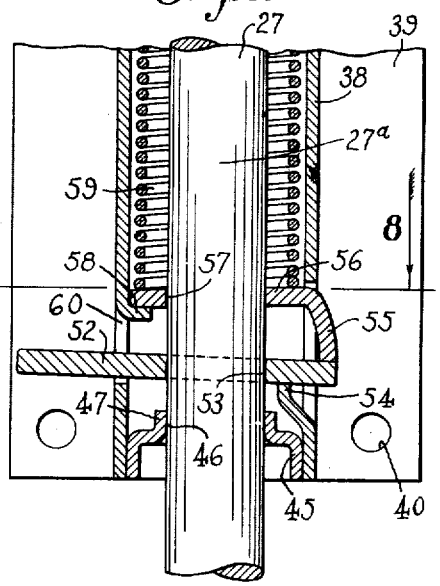
Fig. 6.
Fig. 4A.
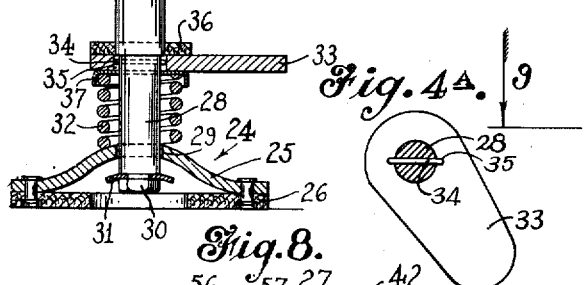
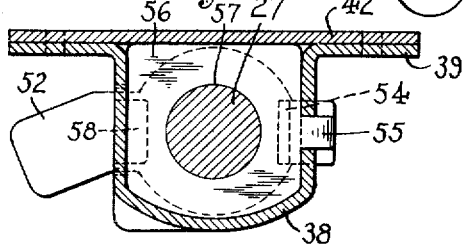
Fig. 8.
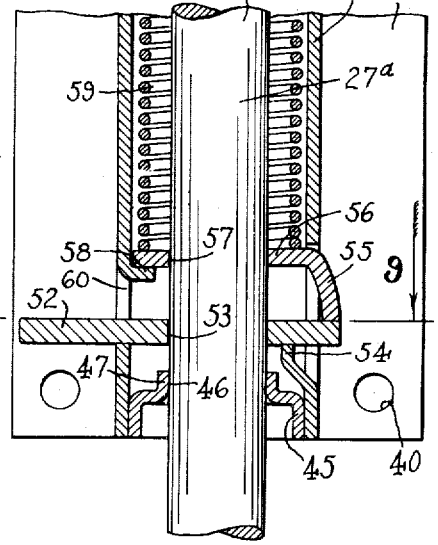
Fig. 7.
Inventor
Walter F. Herold
By Rockwell Bartholow
Attorneys Patented May 27, 1947

2,421,328

UNITED STATES PATENT OFFICE 2,421,328

INDUSTRIAL TRUCK

Walter F. Herold, Easton, Conn., assignor to The Bassick Company, Bridgeport, Conn., a corporation of Connecticut Application May 30, 1945, Serial No. 596,651

20 Claims. (Cl. 188—5)

1

This invention relates to industrial trucks, and more particularly to provisions for anchoring and stabilizing the truck or other movable object. In my Patent No. 2,360,874, dated October 24, 1944, there is described an anchoring device having a foot-like member movable downwardly to engage the floor, with resilient contact, said member being operable by a toggle so that the foot member is movable between predetermined elevated and depressed positions. The present invention relates to a device of the same general class, involving certain improvements which, among other things, adapt the device to other conditions of use and enlarge its scope.

One of the objects of the invention is to provide a simple, inexpensive anchoring device meeting a large number of different conditions and operating very satisfactorily in service.

Another object is to provide improved means whereby the foot member can be effectively locked in any of a large number of vertical positions for anchoring the truck and readily released when it is desired to move the truck.

In the accompanying drawings:

Fig. 1 is a fragmentary perspective view of an industrial truck equipped with one of the anchoring devices, the same being in anchoring position;

Fig. 2 is an elevational view showing the anchoring device in the position of Fig. 1, looking toward the side of the guide casing;

Fig. 3 is a top plan view of the parts shown in Fig. 2;

Fig. 4 is a sectional view on line 4—4 of Fig. 2;

Fig. 4A is a detail horizontal section of certain parts shown in Fig. 4.

Fig. 5 is a view similar to Fig. 4, showing the foot member in the fully raised position;

Fig. 6 is a sectional view showing on a larger scale certain parts appearing in Fig. 4, the foot member being in a lowered position;

Fig. 7 is a view similar to Fig. 6, illustrating the tripping of the latch member to release it;

Fig. 8 is a section on line 8—8 of Fig. 6;

Fig. 9 is a section on line 9—9 of Fig. 7; and

Fig. 10 is a detail of the guiding head at the upper end of the stem.

In Fig. 1 there is illustrated a typical mounting of the anchoring device on a truck. In this particular case the truck has a body 20 provided with casters of which one (21) appears in the drawings, this caster being at one of the corners of the truck. To one side of the truck body is applied one of the improved anchoring devices, the same being generally indicated at 22. This anchoring device comprises in its general features a guide casing or housing 23 fixed to the truck body adjacent the side of the later, and a member 24 adapted to engage the floor or other surface on which the truck rolls for the purpose of anchoring the truck against movement. The member 24 is equipped with a stem or plunger having sliding relation with respect to the guide casing 23, and can be depressed to engage the floor and latched in the depressed position. The sliding member can be latched in any of a large number of different vertical positions in which it is engaged with the floor so as to adapt the device to variations in the supporting surface and to different locations in which the guide casing may be fixed on the truck body. The casing contains mechanism by which the stem of the foot member is latched against upward movement whereby the foot member is firmly held in the truck-anchoring position, but when it is desired to shift the truck the latching mechanism can be readily released.

Referring now to the details of the particular device selected for illustration, it will be noted that the foot member comprises a member 25 constituted by an inverted cup of metal having applied to the lower part thereof a facing 26 of suitable friction material which is adapted to engage the floor or other supporting surface. Projecting downwardly into the member 25 is the lower end portion of a stem or plunger 27, which stem or plunger is at its lower end connected to the foot member and at its upper end is guided in the guide casing 23. The stem or plunger 27 has a main portion 27ª, and adjacent the lower extremity a portion 28 of reduced diameter. The portion 28 extends partially into the cup-like member 25 through an opening 29 in said member, which opening receives portion 28 with a considerable amount of clearance. Applied to the lower extremity of the portion 28 is a nut 30 holding in position a projecting part such as a metal washer 31 which prevents the withdrawal of the stem upwardly out of the cup member, the arrangement being such that the foot member can slide to an extent relatively to the stem and can swing relatively to the stem to a certain extent. The swinging mounting of the foot member is particularly of advantage where the floor or other supporting surface is uneven.

Surrounding the portion 28 above the foot member is a coil spring 32, which spring is interposed between the upper face of the foot member and the lower part of a laterally projecting member 33 fixed on the stem. In this particular case the projecting member 33 is an arm pinned to the stem by a pin 34 located in an opening 35 formed in member 33, and the upper surface of member 33 is approximately at the level where portion 28 joins the main part of the stem. Immediately above member 33 a washer 36 of leather or other suitable material embraces the body portion of the stem. Adjacent the lower surface of the member 33, a sheet metal cup 37 receives the upper end portion of spring 32, the function of this cup being to center the spring and maintain it in proper relation to the other parts. The spring 32 is under compression, its lower end portion acting against the foot member to hold the foot member against the washer 31 in the relation shown in Fig. 5.

The guide casing 23 has provisions by which it can be attached to the truck body, and it also has a casing portion, preferably non-circular in cross section, whereby the upper end portion of the stem is guided vertically. In the form shown, the casing has a stem-guiding portion 38 of generally rectangular cross section, and at the respective sides of said portion attaching flanges 39 provided with holes 40 for attaching screws 41. In the particular form shown the casing has a rear plate 42 connected to the flanges 39 by spot welds 43, the rear plate reinforcing the flanges 39 and being provided with holes registering with the holes 40. At the upper end the casing portion 38 is closed in a suitable manner as by means of a sheet metal plate 44. At the lower end the casing portion 38 is closed in a suitable manner, as by means of a cup-like member 45 held in place by means such as welding. This cup-like member 45 has a round aperture 46 surrounded by a flange 47, thus providing a ring-like fixed guide in the lower end portion of the casing in which the cylindrical stem body is smoothly guided.

The stem body is also guided in the casing portion 38 by means provided adjacent the upper end of the stem body, which means may include a sheet metal guiding head 48. The head 48 may have an opening 49 engaging a polygonal portion 50 at the upper end of the stem, which polygonal portion is upset, as shown at 51, in order to hold the guide head in place. The guide head 48 is of a shape such that it conforms to the casing portion to prevent rotation of the head relative to the casing, and by means such as described above the stem is non-rotatively secured to the guide head.

The latching device used for holding the stem in position is mounted in the lower portion of the guide casing, and it is shown as comprising a lever member 52 provided intermediate its ends with a round opening 53 adapted when the lever member is tilted to have gripping engagement with the cylindrical stem for the purpose of holding it in the desired longitudinal position. The lever 52 is pivotally supported in the guide casing so as to be capable of tilting movement, the pivot being spaced slightly from one side of the stem. In the particular form shown the pivot for the lever is provided by an upstanding lip 54, which in this instance is formed by deformation of a part of the side wall of casing portion 38. The lip 54 engages the under portion of the lever, as shown in Fig. 6, at a point somewhat short of the right-hand extremity of the lever (Fig. 6). This right-hand extremity is engaged from above by a depending portion 55 of a member 56 having an opening 57 whereby it embraces the stem at a point some-what above the location of the latching lever 52. The member 56 is in the nature of a plate conforming at its edges to the interior of the casing. This member rests at its left-hand side (Figs. 6 and 8) upon a lug 58 bent inwardly from the casing wall, while at the right-hand side of the member the depending portion 55 is provided, this being in the nature of a lug projecting in a generally downward direction. The depending lug projects laterally from the casing to a certain extent, as does also the right-hand extremity of lever 52 (Fig. 6), this being permitted by suitable slotting of the casing wall. A coil spring 59 is provided in the casing, the same being interposed between member 56 and guide head 48, and surrounding the stem and normally being under some compression so as to act against head 48 and hold the stem in the elevated position shown in Fig. 5.

The lever 52 has at the left-hand side of the stem (Fig. 9) a portion 52ª projecting out of the casing by way of a cutaway portion 60, and this projecting portion of the lever is thus accessible for manipulation by hand or by the foot of the operator in tripping the lever, as hereinafter described.

It will be apparent that the thrust of the lower part of spring 59 is taken up by plate 56 supported by casing lip 58, whereby an abutment for the lower end of the spring is provided. Referring to Fig. 6, it will be seen that the lip 58 acts as a pivotal support for plate 56 to an extent at the left-hand side of the plate. A certain amount of vertical movement is permitted at the right-hand side of the plate (Fig. 6) where a portion of spring 59 is active in pushing downwardly against plate 56, normally maintaining it in the position shown in Fig. 6, where it presses downwardly on the right-hand extremity of lever 52 sufficiently to latch the stem in place, the left-hand end of lever 52 being slightly raised. Spring 59, therefore, performs two functions, namely, it normally holds the stem in the uppermost position, and it also acts through plate 56 and its lug 55 to hold the latch lever in the engaged or latching position.

In the operation of the device, the foot member in the inoperative position will be drawn up by spring 59 to the position shown in Fig. 5. Here the leather washer 36 takes up against the lower end of the guide casing. When the stem is carried upwardly to the position shown in Fig. 5 the leather washer will strike against the lower end of the casing, thus cushioning the impact.

The device being in the position of Fig. 5, and it being desired to anchor the truck, the projecting member or arm 33 is engaged, usually by the foot of the operator, to force the anchoring member in a downward direction, the stem being guided in the casing. The lower surface of the foot member engages the floor or like support, and as downward pressure on arm 33 is continued, spring 32 is compressed to a degree, exerting a resilient downward pressure against the foot member, holding it resiliently against the underlying support.

The stem 27 is free to move from the position of Fig. 5 to the position of Fig. 4 without manipulation of the latch mechanism previously described, because on downward pressure the stem will slide downwardly in the opening of lever 52 with only slight resistance. The stem is moved to a position where the foot member is thrust against the support, and the force of the thrust is somewhat increased by the action of the spring 32, providing a resilient engagement, and the foot member being free to tilt and to conform to the underlying surface within certain limits. As the foot member engages the underlying support, the resistance encountered by the stem causes the latch lever to be tilted on its pivot and to be moved into engagement with the stem to latch it in place. The weight of the truck is sustained to a degree by the anchoring device, although the caster wheels 21 or other wheels usually remain in light contact with the floor. Under such conditions the anchoring device effectively anchors and stabilizes the truck, although it may be necessary to use two or more anchoring devices, depending upon the character of the vehicle, platform or other object which is to be anchored.

When it is desired to release the vehicle, so that it may be moved to another location, it is simply necessary to trip the latching mechanism by exerting a small amount of pressure on the end portion 52ª of lever 52 against the upper surface of the lever. This moves the lever pivotally (with lug 54 acting as a pivot) from the position shown in Fig. 6 to the position shown in Fig. 7. As this movement takes place the lever disengages the stem and the latter moves upwardly under the influence of springs 32 and 59. Spring 32 acting against arm 33 moves the stem upward to a certain extent as soon as the latch is released, and when this occurs the spring 59 acts to move the stem upwardly, and if the lever 52 is held depressed for a short interval of time the stem will move from the anchoring position, such as shown, for example, in Fig. 4, to the completely retracted or lifted position, shown in Fig. 5.

One of the advantages of the improved device is that the stem can be latched in any of a large number of different positions with respect to the casing member. In the particular mechanism shown the latch will be effective at any point in a predetermined length of the stem. The latching structure is very effective, and by having a relatively large number of possible latching positions the scope of the device is increased. There is more latitude in locating the guide casing on the vehicle or other object, and it is easier to have a full and effective engagement with the underlying support than would otherwise be the case. In the example shown, the maximum downward throw of the foot member is about four inches, and this usually will be ample, but I do not limit myself to any particular dimensions. The action in moving the foot downwardly is of the simplest, and can be performed very quickly, and the release of the stem can also be effected very quickly and conveniently, with a minimum of effort on the part of the operator. Moreover, the device is of simple structure and can be produced at relatively low cost. The anchoring device, moreover, can be of relatively light weight, and it is easy to apply to the vehicle or other object.

The spring-controlled lost-motion connection between the foot member and its carrying stem provides in effect a shock absorber or vibration damper between the foot member and the stem, insuring proper holding action of the latching device, notwithstanding vibrations of the floor that are transmitted to the foot member. These vibrations are absorbed by the spring and are not transmitted to the stem.

It will be apparent that the described structure provides among other things, an anchoring device in which a stem member is guided rectilinearly within a chambered casing by means adjacent the lower end of the casing and by means of engagement located adjacent the upper end of the stem member, the casing housing a latching or gripping lever having a gripping opening intermediate of its ends through which the stem extends, said lever being pivoted intermediate of its ends by resting on a pivotal support engaging it from beneath, said support being carried by the casing, the lever being acted upon at one side of the pivotal support by a tilting spring acting through a spring-pressed plate having a lug, and the lever being provided on the opposite side of the pivotal support with a portion accessible at the exterior of the casing whereby the lever can be tripped or otherwise manipulated.

While in the case illustrated the stem has a smooth surface in that portion which extends through the latching lever, the invention is not limited in this respect, and the stem may have teeth or the like for latching purposes within certain aspects of the invention. Only one form of the device is illustrated in the drawings, but various changes in the organization of parts and in the details can be made without departing from the principles of the invention or the scope of the claim.

What I claim is:

1. An anchoring device for industrial trucks and the like, comprising a housing adapted to be fastened to the lower portion of the truck body and having a chamber therein, a plunger having an upper portion moving in said chamber, a spring in said chamber acting against the plunger and tending to hold the plunger in a raised position, the lower portion of the plunger being disposed outside of said chamber, a foot member carried by the lower end portion of the plunger, a spring surrounding the plunger above the foot member and adapted to exert pressure on the foot member in the direction of the floor, a laterally extending arm fixed on the plunger above said last spring by means of which the plunger can be pressed downwardly, and a latch mechanism carried by the housing adjacent the lower part thereof and cooperating with the plunger to maintain the foot member in engagement with the floor.

2. An anchoring device such as described, comprising a movable member including a vertically guided stem and an associated foot member engageable with a supporting surface, said foot member being mounted upon the lower end of said stem for a certain amount of independent movement lengthwise of the stem, a spring surrounding the stem and engaging the foot member from above for pressing the foot member downwardly against the floor, the upper end of said spring being fixed with relation to the stem, a manipulating member fixed to the stem above the spring and adapted to be engaged and pressed downwardly for engaging the foot member with the floor and compressing said spring, and a latch mechanism associated with said stem whereby said spring is held under compression.

3. An anchoring device such as described, comprising a guide member attachable to a vehicle body, a stem guided up and down in said guide member, a foot member having an upper opening through which the lower part of the stem passes with clearance, a projection on the lower end of the stem below said opening preventing the upward withdrawal of the stem from the foot member, a coil spring surrounding the stem and pressing downwardly against the foot member to hold it engaged with said projection, the upper end of said spring being in fixed relation to said stem, the stem when depressed being adapted to hold the foot member yieldingly against the floor, and a device for holding the stem in the depressed position.

4. An anchoring device such as described, comprising a guide casing attachable to a vehicle body, a stem guided up and down in said casing and having a floor-engaging foot, a spring in said casing acting on the stem to hold the latter in an elevated position, and a latching device engageable with the stem to hold the stem against upward movement, said latching device including a part held in operative position by said spring.

5. An anchoring device comprising an elongated guide casing presenting an interior chamber, a stem disposed partially in said chamber and partially below the chamber, said chamber having means adjacent the lower end thereof for guiding the stem, and said stem having provisions adjacent the upper end thereof whereby it is guided in the casing, a spring normally holding the stem in elevated position, the lower part of said stem having a projection whereby it may be pressed downwardly to engage the floor, and a pivoted gripping latch engageable with the stem within the lower part of the casing for holding the stem in the depressed position, said pivoted latch having an opening whereby it grippingly engages the stem, the pivot of said latch being constituted by a member at one side of the stem supporting the latch from beneath.

6. An anchoring device comprising an elongated guide casing presenting an interior chamber, a stem disposed partially in said chamber and partially below the chamber, said chamber having means adjacent the lower end thereof for guiding the stem, and said stem having provisions adjacent the upper end thereof whereby it is guided in the casing, a spring normally holding the stem in elevated position, the lower part of said stem having a projection whereby it may be pressed downwardly to engage the floor, and a pivoted gripping latch engageable with the stem within the lower part of the casing for holding the stem in the depressed position, said pivoted latch having an opening whereby it grippingly engages the stem, the pivot of said latch being constituted by a member at one side of the stem supporting the latch from beneath, said latch being provided at the opposite side of the stem with a tripping extension.

7. An anchoring device such as described, comprising a vertically arranged elongated casing, a floor-engaging member having an upper stem portion guided in said casing, means in the casing acting on the stem portion to hold said member in elevated position, an upwardly projecting pivot member at one side of the stem adjacent the lower end of the casing member, a lever in the form of a plate having a portion resting on said pivot member, said lever having an opening of which the edge is adapted to grip the stem and the lever having an operating extension at that side of the stem portion opposite the pivot member, the lever being continued beyond the pivot member at the side of the stem portion opposite said extension, and a spring-pressed member having a lug pressing against the upper surface of the lever in the continued portion above mentioned.

8. An anchoring device such as described, comprising a guide casing, a stem guided up and down in said casing and having a lower floor-engaging foot, a coiled spring in said casing around the stem having an upper end portion acting against the upper end portion of the stem to hold the stem in an elevated position, and a latching device engageable with the stem to hold the stem against upward movement, said latching device including a pivoted gripping member and a part acting on said gripping member and held against the gripping member through engagement with the lower end portion of said spring.

9. In an anchoring device, the combination of a vertically movable plunger, a member guiding the upper portion of the plunger, a plate-like gripping element having an opening through which the plunger extends, a spring-pressed member engaging said plate-like element from above in a region which is spaced laterally from the plunger, and a pivotal support for said plate-like element disposed beneath and engaging the same at the same side of the plunger as said spring-pressed member, said pivotal support being located between the side of the plunger and the region of engagement between the plate-like element and the spring-pressed member.

10. A device for anchoring a moving vehicle or the like, comprising a slidably mounted plunger on the vehicle, a presser foot, a lost-motion yielding connection between the plunger and the presser foot including a resilient member which is compressed when and as the presser foot is pressed against the floor through movement of the plunger to thereby anchor the vehicle, and a latch which latches the plunger in the anchoring position.

11. A device as set forth in claim 10, in which the latch is operative to latch the plunger substantially at any point in a given length of the plunger.

12. An anchoring device such as described comprising a sheet metal casing vertically elongated and having side flanges for attachment to a vehicle body, said casing being of polygonal horizontal section and closed at the top and having a round guide opening adjacent the lower end, a plunger of round cross section having its upper part in the casing and guided by said guide opening, the plunger being continued out of the casing at the lower part of the plunger and carrying a floor-engaging foot, the upper end of said plunger being equipped with a polygonal guiding head engaging the casing, a lifting spring for the plunger disposed in the casing and engaging under said guiding head, and a pivoted latch for said plunger located within the lower part of the casing beneath the lower end of said spring and having a tripping extension extended laterally through a slot in the casing wall.

13. An anchoring device such as described comprising a sheet metal casing vertically elongated and having side flanges for attachment to a vehicle body, said casing being of polygonal horizontal section and closed at the top and having a round guide opening adjacent the lower end, a plunger of round cross section having its upper part in the casing and guided by said guide opening, the plunger being continued out of the casing at the lower part of the plunger and carrying a floor-engaging foot, the upper end of said plunger being equipped with a polygonal guiding head engaging the casing, a lifting spring for the plunger disposed in the casing and engaging under said guiding head, a pivoted latch for said plunger located within the lower part of the casing beneath the lower end of said spring and having a tripping extension extended laterally through a slot in the casing wall, and a manipulating arm for said plunger fixed to the plunger and extending laterally therefrom, said manipulating arm in the fully raised position of the plunger being located below but closely adjacent the lower end of the casing.

14. A device for anchoring a moving vehicle or the like comprising a slidably mounted vertical plunger on the vehicle, a latch engageable with the plunger laterally thereof to latch it in a depressed position, a presser foot loosely mounted on the lower end of the plunger adapted to be moved downwardly on downward movement of the plunger, and shock absorbing means adapted to prevent dislocation of the latch through vibrations imparted to the presser foot.

15. A device for anchoring a moving vehicle or the like comprising a slidably mounted vertical plunger on the vehicle, a latch engageable with the plunger laterally thereof to latch it in a depressed position, a presser foot loosely mounted on the lower end of the plunger adapted to be moved downwardly on downward movement of the plunger, and shock absorbing means adapted to prevent dislocation of the latch through vibrations imparted to the presser foot, said shock absorbing means comprising a spring between the presser foot and the plunger.

16. A device for anchoring a moving vehicle or the like comprising a vertically elongated guideway applied to the vehicle body, a plunger guided vertically in said guideway and having a floor-engaging foot, a pivoted latch engaging the plunger laterally thereof to hold the plunger in a depressed position, and a spring arranged to act on said latch and also on said plunger to normally hold the plunger in an elevated position.

17. An anchoring device comprising a sheet metal casing vertically elongated and having side flanges for attachment to a vehicle body, said casing being of polygonal cross section and closed at the top and having a bottom with a round guide opening therein, a plunger of round cross section having its upper part in the casing and guided by said guide opening, the plunger being continued out of the casing at the lower part of the plunger and carrying a floor-engaging foot, the upper end of the plunger being equipped with a polygonal guiding head engaging the casing, a lifting spring for the plunger disposed in the casing and engaging under said guiding head, and a pivoted latch for said plunger located within the lower part of the casing beneath the lower end of said spring and having a tripping extension extended laterally through a slot in the casing wall.

18. An anchoring device comprising an elongated casing adapted to be vertically disposed on a vehicle at the side thereof and having a closed top and a bottom portion provided with a guide opening, a plunger having its upper part in the casing and guided by said guide opening, the plunger being continued out of the casing at the lower part of the plunger and carrying a floor-engaging foot, the upper end of the plunger having guide means engaging the casing, a lifting spring for the plunger disposed in the casing, an upwardly projecting pivot member associated with the lower end portion of the casing and located inwardly of the lateral wall of the casing, and a latch for said plunger located within the lower part of the casing and in embracing relation to the plunger and fulcrumed intermediate of its ends on said upwardly projecting pivot member, said latch having a tripping extension extended laterally through a slot in the casing wall.

19. A device for anchoring a moving vehicle or the like, comprising a slidably mounted vertical plunger on the vehicle, a latch member in embracing relation to the plunger and engageable with the plunger laterally thereof to latch it in a depressed position, a casing member enclosing the latch member and a portion of the plunger, said latch member engaging at its lower surface and intermediate of the ends thereof an upwardly projecting pivot member, one end of said latch member extending out of the casing member to act as a tripping extension, and the other end of said latch member being subjected to spring pressure from above to tip the latch member.

20. An anchoring device such as described, comprising an elongated casing adapted to be vertically disposed on a vehicle at the side thereof, a stem having an upper portion guided in said casing, the lower end of said stem carrying a floor-engaging member, a spring acting on the stem adjacent the upper end thereof to hold the stem in a raised position, and a pivoted latching device in the lower end portion of the casing in embracing relation to the stem and adapted to engage the stem laterally to lock it in a depressed position, said latching device comprising a plate-like member supported intermediate of its ends from beneath to provide a pivot therefor, one end of said member being engaged from above by a spring-pressed element acting to tip the latching member.

WALTER F. HEROLD.

REFERENCES CITED

The following references are of record in the file of this patent:

UNITED STATES PATENTS

| Number | Name | Date |
|---|---|---|
| 2,360,874 | Herold | Oct. 24, 1944 |
| 991,241 | Rae | May 2, 1911 |
| 1,412,397 | Flagg | Apr. 11, 1922 |